Figure 1:
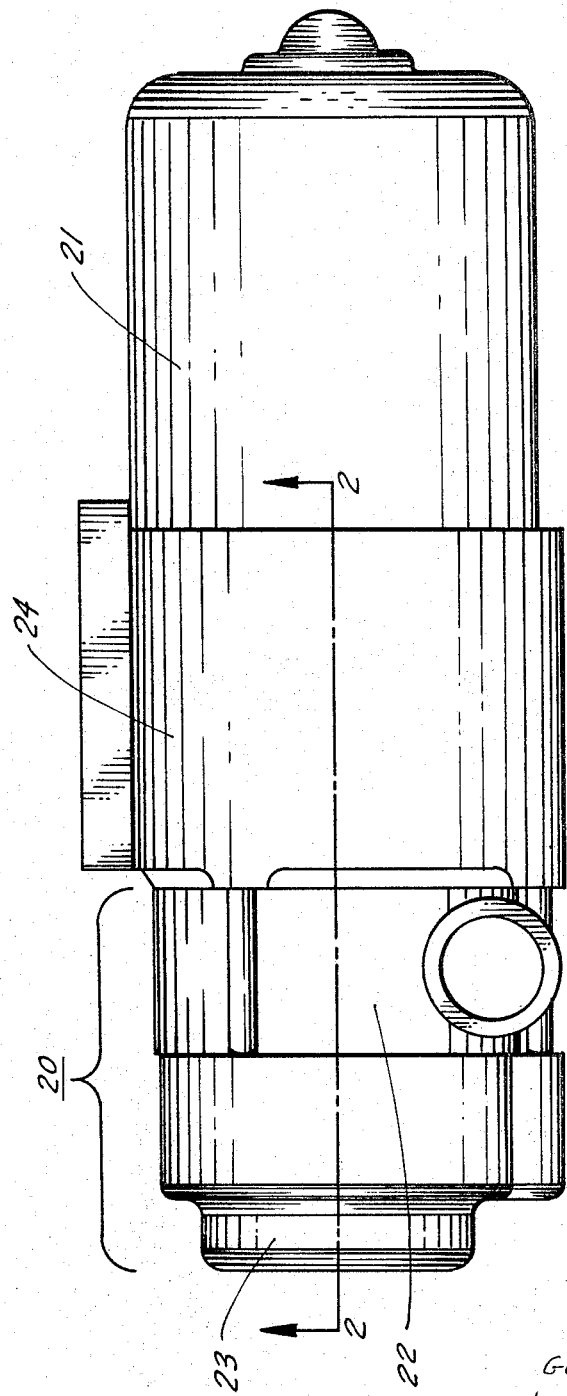

George L. Congdon
Larry L. Peiffer   INVENTORS
Leo F. Perry
BY George E. Szekely
Attorney George L. Congdon
Larry L. Peiffer  INVENTORS
Leo F. Perry
BY George E. Szekely
Attorney July 25, 1967  G. L. CONGDON ETAL  3,333,127
MAGNETIC DRIVE OR COUPLING
Filed Dec. 27, 1965  3 Sheets-Sheet 3

George L. Congdon
Larry L. Peisser  INVENTOR.
Leo F. Perry
BY George E. Szekely
Attorney

United States Patent Office 3,333,127
Patented July 25, 1967

---

3,333,127
MAGNETIC DRIVE OR COUPLING
George L. Congdon, Fort Atkinson, Larry L. Peiffer, Whitewater, and Leo F. Perry, Fort Atkinson, Wis., assignors to Bergstrom Manufacturing Company, Rockford, Ill., a corporation of Illinois
Filed Dec. 27, 1965, Ser. No. 516,598
12 Claims. (Cl. 310—105)

This invention relates to a magnetic drive or coupling, utilizing a permanently magnetized member, and is a continuation-in-part of our prior co-pending application for Magnetic Drive or Coupling, filed by us on Dec. 19, 1963, Ser. No. 331,706, now patent No. 3,249,777, issued May 3, 1966.

In the aforesaid application we have shown a drive wherein selectively polarized magnetic discs, rings or the like are opposed to each other in a driving relationship. A principal use of such a drive is found in motor-pump units, in which case the driver and driven members of the magnetic coupling are separated by a membrane forming part of the pump housing, the driven member being within the housing and there exposed to the pumped fluid. It sometimes may be found that material suitable for permanent, selective magnetization, ceramic, for example, will deteriorate, abrade or fracture under severe corrosive or shock conditions with which the involved apparatus may operate. In such case, the construction shown and described in the aforesaid co-pending application may not be entirely satisfactory.

Furthermore, drives wherein both members are permanently and selectively polarized are inherently synchronous, in that upon overload or other cause of rotary slip between the drive and driven members, the coupling relationship is broken and can often be restored only by bringing the drive to a full stop, rematching the poles and restarting the unit. This characteristic involves specialized start and cut-out controls. While this feature provides an often desirable safeguard to motors or other parts of a motive assembly, the specialized controls and service interruptions may be objectionable in many cases.

It is an object of this invention to provide a magnetic drive or coupling in which the drive and driven members are made of dissimilar materials, one of which may be a material highly resistant to shock and corrosion conditions in pumps or other apparatus with which the drive is to be used.

It is a further object of this invention to provide an asynchronous drive in which one coupling member is selectively polarized and the other is a non-magnetic, highly conductive induction member, forming a coupling relationship of the rotation-slip type, whereby the drive can be started in any relative position of the members, may be run satisfactorily under high slip conditions and does not require special starting, running or cut-out controls.

It is a still further object of this invention to provide in a combined permanent magnet/induction ring drive of asynchronous characteristic a construction and arrangement providing ready interchangeability with a permanent magnet drive of the synchronous type in a given assemblage with which the drives are to be used.

Figure 2:
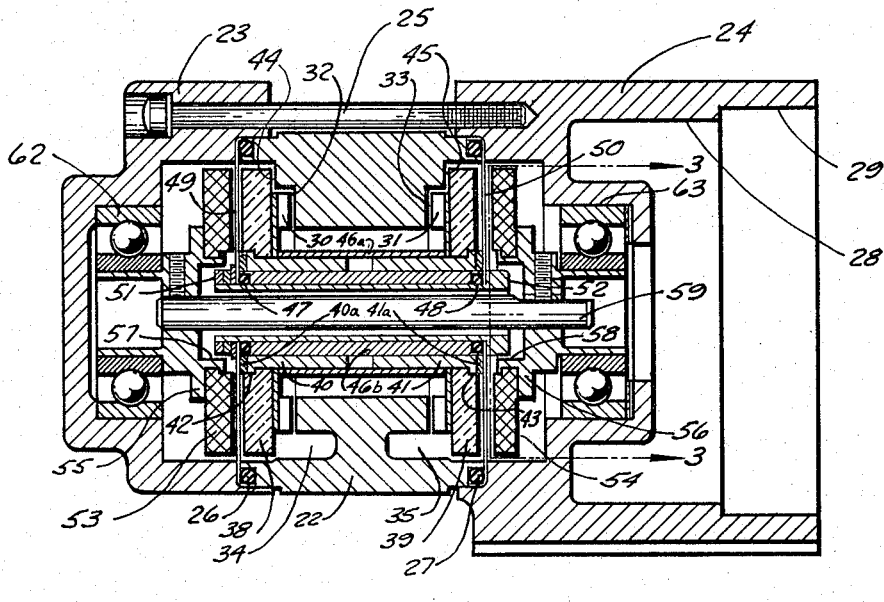
Figure 3:
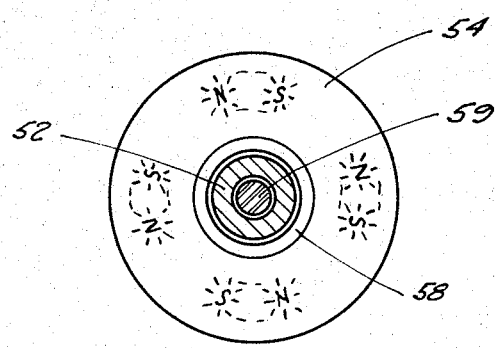
Figure 4:
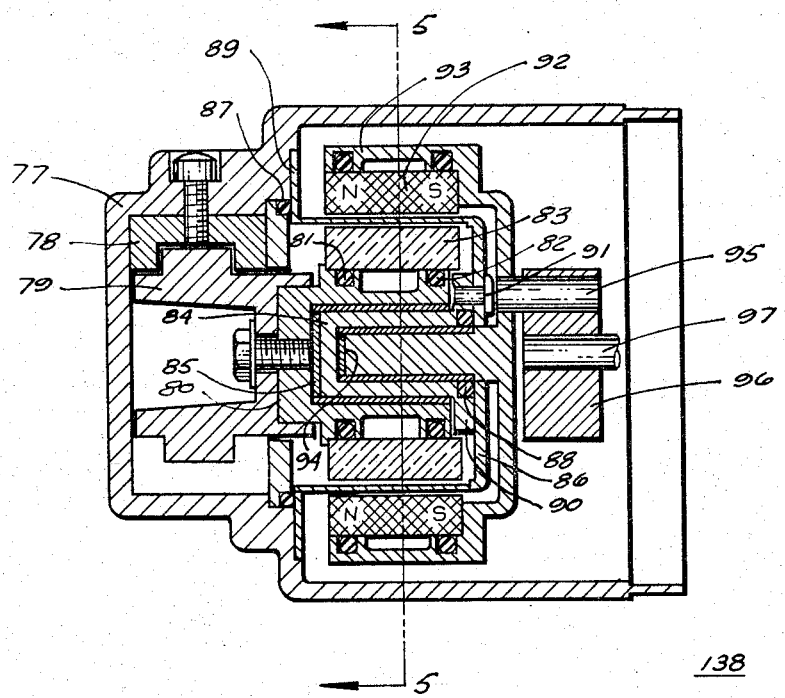
Figure 6:
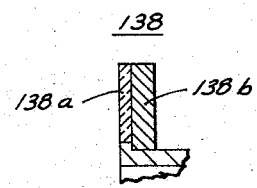
Figure 5:
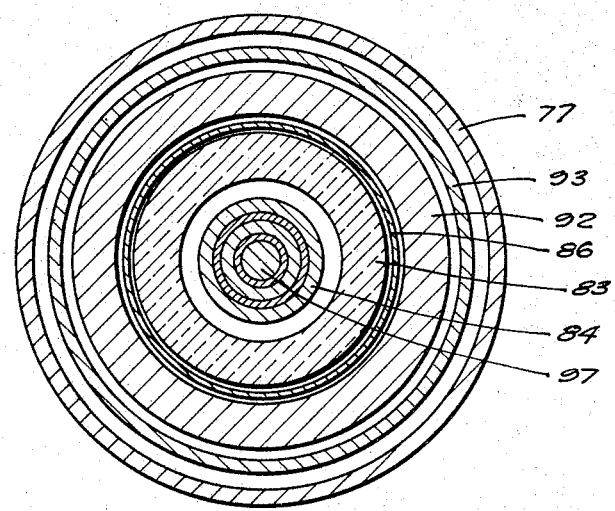
Figure 7:
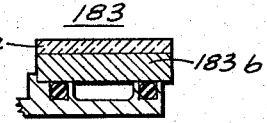

Other objects and advantages of the invention will be apparent from the ensuing description thereof and the accompanying drawings, in which:

FIGURE 1 is an exterior view of a motor-pump assembly incorporating the novel drive of the invention;
FIGURE 2 is a longitudinal section on line 2—2 of FIGURE 1, the motor being omitted;
FIGURE 3 is a partial transverse section on line 3—3 of FIGURE 2, showing one of the drive discs;
FIGURE 4 is a longitudinal section through another style of pump, showing another form of the invention incorporated therewith;
FIGURE 5 is a transverse section on line 5—5 of FIGURE 4; and
FIGURES 6 and 7 are partial longitudinal sections of a modified induction disc and ring respectively.

While the drawings show the novel drive of this invention as applied to pumps, for which application the drive is particularly advantageous, it will be understood throughout that the invention is not limited to use with pumps or any particular type of motive equipment, but is useful with fans, compressors, mixers and other rotary apparatus. Furthermore, while horizontal drive arrangements are shown, the drive may also be arranged for driving about vertical or inclined axes.

Referring now to FIG. 1, reference numeral 20 represents a pump and 21 is a motor to be coupled to pump 20 for driving same. The elements of the drive which are external of pump housing 22 are concealed and protected by auxiliary cap 23 and housing 24. While magnetic drives according to this invention may be close coupled, if desired, and as later shown, it is preferable in the form now being described that the motor 21 be mounted somewhat remote from pump 20. For this reason, housing 24 is elongated, to bridge the space between pump 20 and motor 21.

As best seen in FIG. 2, cap 23 and housing 24 may be held to pump housing 22 by through bolts or screws, one of a series of which is indicated at 25. Seals 26, 27, 47, 48 make the assembly fluid tight. The end of housing 24 remote from pump 20 may be provided with motor alignment means, such as counterbores 28, 29, or such other provision as will fit the flange, end bell or other mounting provision on the selected motor (not shown), which may be of any desired type and rating, as best suited to the particular duty.

The drive form of FIG. 2 is primarily intended for use with the dual-impeller pump arrangement shown. Impellers 30, 31 revolve in chambers 32, 33 at opposite faces of housing 22, connecting with pairs of passages such as 34, 35, only portions of which appear in this view.

Impellers 30, 31 are attached to discs 38, 39 in any suitable manner. Discs 38, 39 are made of conductive material, preferably copper for purposes later shown. Discs 38, 39 are affixed to bushings 40, 41, as by crimped tongues 42, 43, or other suitable means, whereby the discs are prevented from shifting circumferentially or axially outward relative to the bushings. The disc-bushing assemblies are held against inward axial shifting toward housing faces 44, 45, by sleeve 46a. Bushings 40, 41 are revolvably mounted on sleeve 46b, at the ends of which are the two seals 47, 48. The enclosure of the pump chamber is completed by two membranes 49, 50, which are clamped against seals 26, 27 by cap 23 and closure 24, and against sleeve 46 by nut 51 and spacer 52. On the exterior of membranes 49, 50, opposite discs 38, 39, are magnet discs 53, 54 whose principal dimensions are the same as those of 38, 39. For economical manufacture and interchangeability, the several discs may be made dimensionally identical, so that magnet discs such as 53, 54, can be readily substituted for conductive discs 38, 39, to form a drive of the type described in our above-cited co-pending application. Discs 53, 54 are further similar to those disclosed in the above cited co-pending application in that same are preferably made of selectively polarizable ferrite or ceramic material in a physio-chemically homogeneous and continuous form as described in a greater detail in said prior application, such material and form being suitable for use under adverse operating conditions such as may prevail internally of a pump or like fluid handling apparatus.

Discs 53, 54 are fixed to hubs 55, 56 by crimp tabs such as 57, 58, similar to the crimps 42, 43. Hubs 55, 56 are in turn fixed to shaft 59 so spaced as to span the membranes 49, 50 and provide preselected gaps relative to opposed discs 38, 39, the latter being positioned between the membranes by thrust washers 40a and 41a.

Hubs 55, 56 are journalled in bearings 62, 63. Shaft 59 projects beyond hub 56 into auxiliary housing 24, at which end it may be coupled in any suitable manner to motor 21 (FIG. 1). Thus, the pump and its magnetic drive comprise an integral structure, which may be pre-assembled to precision standards and then coupled to a selected prime mover, without disturbing the adjustment of the pump and magnetic drive parts. Similarly, should a drive motor subsequently require repair or replacement, the motor can be removed and replaced without disturbing the magnetic drive.

The magnetic discs 53, 54 are so magnetized as to establish a plurality of magnetic fields, preferably equally spaced about the faces of discs 53, 54, as best seen in FIG. 3, which shows poles arranged for four fields. The pole spacing and number of fields are functions of the optimal flux densities and field extent required for given desired torque capacity consonant with the dimensions and properties of the discs, it being desirable to minimize risks of high losses, interior flux breakdown, or flux perforation of boundary surfaces other than the active face. To assure maximum torque capacity with given number of pole sets and flux densities the sets are preferably located as shown in FIG. 3, as close to the disc periphery as possible without flux perforation of the rim.

Referring again to FIG. 2, it will be seen that by virtue of the close proximity of magnet discs 53, 54 to induction discs 38, 39 respectively, the latter intercept the lines of magnetic flux constituting the external magnetic circuits of the pole sets established in the former. While the opposed discs are at a standstill, discs 38, 39 being highly permeable, that is, non-magnetic, are substantially unaffected by the magnetic fields, whose intensities remain substantially unimpaired by the presence of discs 38, 39. If now shaft 59 starts rotating discs 53, 54 the moving magnetic fields intercepted by discs 38, 39 induce current flow in the latter, cutting the magnetic flux and thereby producing attractive forces between opposed disc pairs. The total value of such force is a function of total magnetic field intensity, current capacity of the induction members and the flux cutting rate, the last being a function in turn of the speed differential. In pump apparatus as here shown, inertial forces generally impose high starting torque. In such case, shaft 59 may revolve a number of times before it reaches the differential speed to produce sufficient torque for driving the impeller assembly, to which driven discs 38, 39 are affixed, as hereinbefore described. In many applications this is a desirable starting characteristic, minimizing starting torque on the motor and facilitating the safe use of low starting-torque, less expensive motor types.

When the necessary impeller starting torque has been achieved, the induced attractive forces between driving and driven discs causes the driven assembly to rotate at such speed lower than that of the driving discs as will maintain the flux cutting rate corresponding to the necessary running torque. For example, in a representative case, the discs 53, 54 may be direct motor-driven at a normal-load speed of 3450 r.p.m., with the impeller assembly and discs 38, 39 running at 3400 r.p.m. Such ultimate driven speed will usually be within the range of satisfactory performance for apparatus designed for direct motor connection. However, if a different or variable driven speed should be necessary in a given case, it is obviously feasible to interpose a belt or gear drive of suitable ratio between the motor or other prime mover and the magnetic drive unit. In any case, should the running load exceed design valve, the driven unit will merely run more slowly, and in case of complete blockage or other load conditions exceeding the torque capacity of the magnetic drive, the driven unit would stall, but the prime mover could continue to run safely, provided only that the drive or coupling is designed for torque capacity not exceeding the safe prime mover torque.

*Interchangeability of drive members*

As previously described, discs 38, 39, 53 and 54 are desirably made dimensionally fully interchangeable. In the arrangement described with reference to FIGS. 1–3, the assumed application requires that no ceramic or other comparable magnetic material be used inside the pump casing. Therefore, the construction there shown involves use of magnetic material for driving discs and copper or like high-inductance material for the driven discs. However, other applications for such general drive arrangement may involve inverse corrosive conditions, wherefore it may be preferred that magnetic material be used in the driven members and inductive material in the driving members. Manifestly, the arrangement shown will operate in the described manner, even though the materials of driving and driven discs be interchanged, except that in such case the induction circuits will lead the magnetic fields.

The arrangement of dissimilar discs shown and described with reference to FIG. 2 is such that only minimal thrust need be provided for in the pump impeller assembly, if the pump 20 itself is hydraulically balanced, as in the design shown. In any event no provision need be made to absorb thrust due to magnetoelectric drive forces. The respective pairs of opposed discs are magnetoelectrically identical, the magnetic gaps being set equal by the adjusting means previously described. Thus, axial components of magnetic attraction will be balanced at opposite ends of shaft 59, cancelling out. However, for very small or light duty applications it may be feasible to use a simplified construction with only a single disc pair, such as in FIG. 5 of our above cited co-pending application, nevertheless retaining the important advantages of disc interchangeability and accommodation of diverse service conditions or requirements.

Dimensional interchangeability of driving and driven discs, or their equivalents, leads to desirable mass production economies in adapting our novel drive or coupling to a wide variety of apparatus and operating conditions. For example, stocks of discs in suitable quantities of magnetic and inductive materials facilitate the quick assembly of following drive permutations and combinations as required for particular applications, reading disc materials from left to right of FIG. 2:

(1) Magnetic/induction, induction/magnetic
(2) Induction/magnetic, induction/magnetic
(3) Induction/magnetic, magnetic/induction
(4) Magnetic/induction, magnetic/induction
(5) Magnetic throughout (synchronous)

Arrangement (1) is that shown in FIG. 2 hereof. Arrangement (5) is that shown in our above cited co-pending application. The other arrangements are for use in various structures under diverse construction, service and installation conditions. For example, arrangements (2) and (4) are useful for tandem or staged units, wherewith thrust may be absorbed between units, in lieu of magnetic thrust balance. Arrangement (3), the inverse of (1), is useful where ambient external and internal conditions are the inverse of those contemplated in the selection of arrangement (1).

*Radial-pole couplings*

The face-to-face, or axial-pole, coupling arrangements previously described generally provide maximum conservation of overall size, weight, shaft and bearing loads, inertia and other elements of efficiency or economy. However, there are applications in which axial space limitations preclude achieving all the desirable features of an integrated unit with the axial-pole coupling. In such case, a radial-pole, or telescoping magnet arrangement may be desirable.

FIG. 4 illustrates an adaptation of this invention in the form of a radial-pole, or telescoping ring magnetic coupling. The coupling is shown applied to a centri-tangential pump, for purposes of illustrative comparison with the previously described drives. It will be obvious that variations of structure and power requirements of the driven apparatus will necessitate some variations in the coupling position or construction. For example, the volute case of a centrifugal pump precludes telescoping the impeller proper into the coupling in any practical manner. Therefore, the coupling members are offset from the impeller, as seen in FIG. 4. On the other hand, with an axial flow pump, axial fan or other circular-cased rotary device, full telescoping of the driven member into the coupling members will often be practicable, in which case some mechanical details will differ from FIG. 4, but without departing from the essence of the inventive concept represented.

In the assembly of FIG. 4, casing 77 and liner 78 enclose vane impeller 79, which is clamped to extension hub 80. Spaced O-rings 81, 82 on the outside of hub 80 provide a grip to hold induction ring 83 on hub 80, non-rotatable relative thereto, the exterior diameter of the O-rings being somewhat greater than the inside diameter of ring 83, creating a tight force fit. Thimble 84 is fitted freely inside hub 80, bearing on thrust washer 85. The hub 80 and ring 83 are confined by a thin, non-magnetic, flanged cup 86, which bears on seals 87 and 88 to maintain the casing 77 fluid tight. Cup 86 is drawn down on the seals by means of cap-screws (not shown) bearing on flange 89 and threaded to housing 77. Seal 88 bears on the end of thimble 84 and is confined by retainer 90, which is fastened to cup 86 by rivets 91.

Magnet ring 92 is pressed into cup 93, which has a center pilot stud, journaled in cup 89 and projecting into thimble 84, with its inner end bearing on thrust washer 94, thereby positioning ring 92 concentric and axially co-extensive with ring 83. Cup 93 is revolved by means of a crank mechanism consisting of pin 95 and eccentric 96, the latter being removably fixed to shaft 97 of a motor (not shown). Obviously the motor shaft could be directly connected to a hub provided on cup 93, but not only would the overhang load be excessive for the normal motor shaft, but the positioning of cup 93 would be directly involved with the assembly and positioning of the motor. As with the assembly of FIG. 2, it is desirable to position the drive members independently of the motor position, so that motors may be installed, removed, repaired and restored without disturbing the drive member positions. The arrangement of FIG. 4 provides a close-coupled means of accomplishing the purpose, motor removal being accomplished merely by freeing eccentric 96 from shaft 97, to which it is held by a set-screw or the like (not shown). Obviously a shaft extension from cup 93 could be separately coupled to a coaxial motor shaft, but such arrangement would unduly increase the overall assembly length, partially defeating a principal objective of the radial-pole magnetic coupling.

Since induction ring 83 is not polarized, magnetic attraction resultants will be in radial planes, regardless of any axial mismatch of rings 83 and 92. Thus, no axial thrust problem is posed. Furthermore, by establishing circumferentially equidistant pole sets in magnet ring 92, as is desirable, diametrically opposite radial forces outward of ring 83 will always balance, avoiding eccentric radial magnetic load on the impeller assembly or shaft 97, the several rotating parts of the assemblage being concentrically disposed, as best seen in FIG. 5.

Rings 83 and 92 may conveniently be cast, molded, extruded, rolled or machined from bars, according to considerations of economy and quality with the particular materials selected, generally those similar to materials used for the discs of the form shown in FIG. 2. While the inner and outer rings of the form shown in FIG. 4 are not interchangeable between themselves, desirable manufacturing economy can be obtained by stocking both ring sizes in induction and magnetic materials, four items for a given drive size, whereby to provide the various paired and duplexed combinations described with reference to the form of FIG. 2, for comparable applications.

In the case of drives for high torque applications, the requisite magnetic field intensity may be such that there would be some flux penetration of the highly permeable induction member, with consequent reduction in efficiency. Such field dissipation by flux penetration of the induction member can be avoided or minimized by constructing such member partly of conductive material and partly of magnetic material. Examples of such composite induction members are illustrated in FIGS. 6 and 7, wherein parts corresponding to those of forms previously described are correspondingly numbered, with the addition of 100.

Disc induction member 138, FIG. 6, is shown in the orientation of disc 38, FIG. 2. Member 138 is a laminate, comprising a conductive portion 138a and magnetic portion 138b. In use, portion 138a is faced toward the mating magnetic member, such as disc 53, FIG. 2. When so arranged, any flux that penetrates portion 138a is collected in portion 138b, closing the flux circuit with minimum losses. That is, provision of the magnetic material backing represented by portion 138b effects a reinforcement of the magnetic field, to sustain the maximum intensity for which the magnet member of the drive is magnetized and polarized. The material of portion 138b may be soft iron or low-carbon steel, for examples.

Similarly, the induction portion 183a of induction ring 183, FIG. 7, may be backed by an inner magnetic portion 183b, for use in a drive arrangement such as shown in FIG. 4. To make the modified induction members, the lamination may be accomplished by fusing or cementing the magnetic material to the conductive material. In the usual case, the reduction in depth of conductive material, in the direction of flux emission, will have no deleterious consequence. The presence of the magnetic backing obviates flux dissipation, as described above. Since a practical total cross-section provides an excess current capacity in the induction member, the reduced section of conductive material does not deprive such member of necessary conductance, wherefore a suitable volume of magnetic backing may be merely substituted for the same volume of conductive material, within the same overall dimensions. Thus the laminar induction members may be mechanically fully interchangeable with their solely conductive counterparts, for arrangements as shown in FIGS. 2 and 4. Further, the laminar disc 138 may also be interchanged with magnetic discs 53, 54 to construct various combinations and orientations of axial coupling units for high torque applications.

The conductive-magnetic laminate not only minimizes magnetic losses, but minimizes overheating as well, a further advantage of particular significance in high torque applications. As the applied torque increases, the IR factor of the induction member increases proportionately, and heat generates as a function of $I^2R$. With lower values of R, the values of I for given torques will be higher in inverse proportion. Near peak demand and maximum slip, the value of $I^2$ may be such as would result in overheating at high driving speed and correspondingly high power delivery, particularly if the driven apparatus stalls or slows excessively due to an overload, in which case all or most of the power is dissipated as heat. Therefore, for given torque and power requirements, it is desirable that the current component of the IR factor be kept to the minimum consistent with mechanical and magnetic requirements of the drive. With the laminated induction member, the volumes of the conductive and magnetic portions may readily be proportioned to provide the requisite combination of characteristics for a particular drive application, having induction current values minimal and resistance values maximal, to the extent compatible with the magnetic field conditions. The current and resistance values for normal operation with a selected conductive material may be established such that, as the temperature tends to rise above a predetermined safe value, the increase in resistance, and corresponding drop in current, provides a desirable self-limiting power and heat generation characteristic, precluding or minimizing overheating of drive components and associated apparatus, such as bearings and motors, for example. The self-limiting characteristic is inherent in the $I^2R$ power and heat functionality. However, the laminar induction member provides a design for conveniently predetermining limiting values for particular operating conditions, without varying overall size of the member, changing materials or introducing other, more complex design variations.

Although several embodiments of the invention have been illustrated and described, by way of example, still other variants in design and arrangement may be made without departing from the spirit and scope of the invention as defined in the claims, which are as follows:

1. A magnetic drive, comprising: a generally circular rotary magnet member having a plurality of magnetic pole sets substantially equally spaced angularly within an annulus remote from said magnet member's axis of rotation, said magnet member being continuous and physio-chemically homogeneous and a generally circular rotary induction member substantially coextensively opposing said magnet member, portions of said induction member being within magnetic fields established by said pole sets, said members being cross-sectionally congruous.

2. A magnetic drive according to claim 1, wherein said magnet member and said induction member are annular discs of dissimilar magnetoelectric properties having substantially the same shape and dimensions, said discs being closely opposed along annular faces thereof.

3. A magnetic drive according to claim 1, wherein said members comprise first drive and driven discs, further including opposed second drive and driven discs similar respectively to said first drive and driven discs, all of said discs being mounted for coaxial rotation, said first and second drive disc being affixed to a common shaft for simultaneous rotation relative to said driven discs.

4. A magnetic drive according to claim 1, wherein said members comprise first annular discs opposed along annular faces in given hand relative to each other, further including second annular magnet and induction discs coaxial with said first discs, said second discs annularly opposing each other in the reverse of said given hand, like discs of each disc pair being affixed to a common rotary member for simultaneous rotation relative to respective opposed discs.

5. A magnetic drive according to claim 1, wherein said induction member consists in part of a highly conductive non-magnetic material and in other part of a magnetic material, said other part being within said fields.

6. A magnetic drive according to claim 1, wherein said members constitute a pair of telescoped rings of dissimilar magnetoelectric properties having substantially the same cross-section dimensions in radial planes, said rings being closely opposed along cylindrical surfaces thereof.

7. A magnetic drive according to claim 6, further including a drive shaft affixed to the outer one of said rings, the inner one of said rings being affixed to a driven member for rotation therewith.

8. A magnetic drive according to claim 7, wherein said outer and inner rings are readily removable from said drive shaft and said driven member respectively.

9. A magnetic drive according to claim 7, wherein said inner ring is affixed to a hub of said driven member, said hub being axially offset from the body of said driven member.

10. A magnetic drive according to claim 7, further including a housing for said driven member having a non-magnetic membrane interposed between said rings, and stationary means associated with said housing and said membrane for sealing said driven member and said inner ring from said outer ring and said drive shaft.

11. A magnetic drive, comprising: a first generally circular rotary magnet member having a plurality of magnetic pole sets substantially equally spaced angularly within an annulus remote from said first magnet member's axis of rotation; a first generally circular rotary induction member substantially coextensively opposing said magnet member, portions of said induction member being within magnetic fields established by said pole sets, said first members constituting a first pair of annular discs opposed along annular faces in given hand relative to each other; a second pair of opposed annular magnet and induction discs, all of said discs having substantially the same shape and dimensions, arranged for coaxial rotation with said second pair spaced from said first pair; a driven member interposed between said first and second disc pairs; a housing for said driven member having non-magnetic membranes interposed between opposed discs of each said disc pair, defining inner and outer discs of said disc pairs, said inner discs being affixed to said driven member for rotation therewith; bearings rotatably supporting said driven member and said inner discs in said housing; a drive shaft extending through said housing, said outer discs being affixed to said drive shaft for rotation therewith; and stationary means associated with said housing and said membranes for sealing said driven member and said inner discs from said drive shaft and said outer discs.

12. A magnetic drive according to claim 11 wherein said second pair is opposed in opposite hand as compared to said first pair.

References Cited

UNITED STATES PATENTS

| 2,754,438 | 7/1956 | Zozulin | 310—105 |
| 2,902,612 | 9/1959 | Whearley | 310—105 |
| 3,073,170 | 1/1963 | Slater | 310—105 X |

FOREIGN PATENTS

| 675,379 | 7/1952 | Great Britain. |

MILTON O. HIRSHFIELD, *Primary Examiner.*

D. X. SLINEY, *Assistant Examiner.*